(12) United States Patent
Wang et al.

(10) Patent No.: US 12,348,338 B2
(45) Date of Patent: Jul. 1, 2025

(54) RECONFIGURABLE CIRCUIT FOR DIFFERENTIAL NETWORK INCLUDING CROSS-COUPLED SWITCH

(71) Applicant: ELECTRONICS AND TELECOMMUNICATIONS RESEARCH INSTITUTE, Daejeon (KR)

(72) Inventors: Seung Hun Wang, Daejeon (KR); Sun Woo Kong, Daejeon (KR); Bong Hyuk Park, Daejeon (KR); Hui Dong Lee, Daejeon (KR); Seung Hyun Jang, Daejeon (KR); Seok Bong Hyun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 49 days.

(21) Appl. No.: 18/395,956

(22) Filed: Dec. 26, 2023

(65) Prior Publication Data
US 2024/0223408 A1    Jul. 4, 2024

(30) Foreign Application Priority Data
Dec. 30, 2022    (KR) .......... 10-2022-0190767

(51) Int. Cl.
*H04L 25/02*    (2006.01)
*H04B 3/02*    (2006.01)

(52) U.S. Cl.
CPC .......... *H04L 25/0272* (2013.01); *H04B 3/02* (2013.01)

(58) Field of Classification Search
CPC .. H04L 25/0272; H04B 3/02; H03H 11/0416; H03H 19/004
See application file for complete search history.

(56) References Cited

U.S. PATENT DOCUMENTS 9,787,264 B2    10/2017    Gao et al.
10,896,143 B1    1/2021    Wimmer et al.
(Continued)

FOREIGN PATENT DOCUMENTS

KR    10-2018-0124578 A    11/2018
KR    10-2045498 B1    11/2019

*Primary Examiner* — Sung S Ahn
(74) *Attorney, Agent, or Firm* — LRK PATENT LAW FIRM

(57) ABSTRACT

A reconfigurable circuit for differential network includes: first circuit which is a two-port differential circuit; first cross-coupled switch circuit connected to first port on one side of the first circuit in parallel; and second circuit connected to second port on the other side of the first cross-coupled switch circuit in series. The first cross-coupled switch circuit includes: first-series switch disposed between and connected to first terminal of the first port and first terminal of the second port in series; second-series switch disposed between and connected to second terminal of the first port and second terminal of the second port in series; first cross-coupled element disposed between and connected to the first terminal of the first port and the second terminal of the second port; and second cross-coupled element disposed between and connected to the second terminal of the first port and the first terminal of the second port.

20 Claims, 14 Drawing Sheets

(56) References Cited

U.S. PATENT DOCUMENTS

2009/0213914 A1* 8/2009 Dong ................ H04L 5/14
  375/219
2015/0311785 A1* 10/2015 Kim ................ H03F 1/0255
  327/536

* cited by examiner

| freq (GHz) | Z0 | L0 (pH) | C0 (fF) |
|---|---|---|---|
| 28 | 50 | 142 | 113 |
| 28 | 25 | 71 | 226 | m15
freq=28.00GHz
SW_OFF_50..SP1.SP.S(1,1)=0.075 / 30.532
impedance = 56.703 + j4.329 m12
freq=28.00GHz
SW_ON_50..SP1.SP.S(1,1)=0.472 / -160.926
impedance = 18.351 + j7.296

RECONFIGURABLE CIRCUIT FOR DIFFERENTIAL NETWORK INCLUDING CROSS-COUPLED SWITCH

CROSS-REFERENCE TO RELATED APPLICATION

This application claims priority to Korean Patent Application No. 10-2022-0190767, filed on Dec. 30, 2022, with the Korean Intellectual Property Office (KIPO), the entire contents of which are hereby incorporated by reference.

BACKGROUND

1. Technical Field

Example embodiments of the present disclosure relate to a radio frequency integrated circuit for a high frequency system. In particular, example embodiments of the present disclosure relate to a circuit capable of varying the topology or parameters of a circuit by providing the isolation of a switch using a cross-coupled switch or capacitor.

2. Description of Related Art

The contents described in this section merely provide background information on the present embodiment and do not constitute the related art.

Research on multi-mode circuits that support multi-band applications, in which one circuit covers multiple frequency bands, or cover multiple operating modes such as a low power mode and a high power mode, is becoming more and more demanding in systems with increasing complexity.

Such a reconfigurable circuit usually changes its state using a switch. In this case, due to a $C_{off}$ which is a parasitic capacitance of a switch using a transistor/metal oxide semiconductor field effect transistor (MOSFET), there is a problem in that, even when the switch is turned off, a side disconnected from the switch is not completely isolated or a signal leaks to the side.

In order to solve the above problem, as a way to offset the $C_{off}$, a method of providing isolation using a resonance effect by using an additional inductor is being considered, but the inductor has a problem of occupying a large area at a device level.

In addition, the method of compensating for the $C_{off}$ with L based on LC resonance also has a problem of limiting an isolation bandwidth.

SUMMARY

Example embodiments of the present disclosure provide a switch configuration that can provide isolation in a wide frequency band during a switching operation using a switch.

Example embodiments of the present disclosure also provide a method of implementing a reconfigurable circuit of a two-port differential network using a cross-coupled switch circuit that can provide isolation in a wide frequency band.

Example embodiments of the present disclosure also provide a reconfigurable circuit capable of easily changing a configuration of a two-port network using a cross-coupled switch circuit.

According to a first exemplary embodiment of the present disclosure, a reconfigurable circuit for a differential network may comprise: a first circuit which is a two-port differential circuit; a first cross-coupled switch circuit connected to a first port on one side of the first circuit in parallel; and a second circuit connected to a second port on the other side of the first cross-coupled switch circuit in series, wherein the first cross-coupled switch circuit includes: a first series switch disposed between and connected to a first terminal of the first port and a first terminal of the second port in series; a second series switch disposed between and connected to a second terminal of the first port and a second terminal of the second port in series; a first cross-coupled element disposed between and connected to the first terminal of the first port and the second terminal of the second port; and a second cross-coupled element disposed between and connected to the second terminal of the first port and the first terminal of the second port.

The reconfigurable circuit may further comprise a second cross-coupled switch circuit connected to a third port on the other side of the first circuit in parallel, wherein the second circuit is disposed between and connected to the first cross-coupled switch circuit and the second cross-coupled switch circuit in series.

Based on an operating mode of the first cross-coupled switch circuit, a parallel combined impedance of an externally expressed circuit by the second circuit or a parallel impedance excluding an influence of the second circuit may be provided as an input impedance of the first port which is equivalently connected to the first circuit in parallel.

In a series connection mode of the first cross-coupled switch circuit, a parallel combined impedance of an externally expressed circuit and the equivalent capacitance by the second circuit may be provided as an input impedance of the first port which is equivalently connected to the first circuit in parallel.

In a first series connection mode of the series connection mode of the first cross-coupled switch circuit, the second circuit may be provided as the externally expressed circuit, and the parallel combined impedance of the second circuit and the equivalent capacitance may be provided as the input impedance of the first port.

In the first series connection mode of the series connection mode of the first cross-coupled switch circuit, the first cross-coupled element may be a first cross-coupled capacitor, and the second cross-coupled element may be a second cross-coupled capacitor.

In the first series connection mode of the series connection mode of the first cross-coupled switch circuit, the first series switch and the second series switch may be turned on.

In the first series connection mode of the series connection mode of the first cross-coupled switch circuit, the first cross-coupled element may be a first cross-coupled switch, and the second cross-coupled element may be a second cross-coupled switch.

In the first series connection mode of the series connection mode of the first cross-coupled switch circuit, the first series switch and the second series switch may be turned on, and the first cross-coupled switch and the second cross-coupled switch may be turned off.

In a second series connection mode of the series connection mode of the first cross-coupled switch circuit, an inverted circuit of the second circuit may be provided as the externally expressed circuit, and a parallel combined impedance of the inverted circuit of the second circuit and an equivalent capacitance may be provided as an input impedance of the first port.

In the second series connection mode of the series connection mode of the first cross-coupled switch circuit, the first cross-coupled element may be a first cross-coupled switch, and the second cross-coupled element may be a second cross-coupled switch.

In the second series connection mode of the series connection mode of the first cross-coupled switch circuit, the first series switch and the second series switch may be turned off, and the first cross-coupled switch and the second cross-coupled switch may be turned on.

In an open mode of the first cross-coupled switch circuit, a parallel impedance of an equivalent capacitance excluding an influence of the second circuit may be provided as an input impedance of the first port which is equivalently connected to the first circuit in parallel.

In the open mode of the series connection mode of the first cross-coupled switch circuit, the first cross-coupled element may be a first cross-coupled capacitor, the second cross-coupled element may be a second cross-coupled capacitor, and the first series switch and the second series switch may be turned off.

In the open mode of the series connection mode of the first cross-coupled switch circuit, the first cross-coupled element may be a first cross-coupled switch, the second cross-coupled element may be a second cross-coupled switch, the first series switch and the second series switch may be turned off, and the first cross-coupled switch and the second cross-coupled switch may be turned on.

In a short mode of the first cross-coupled switch circuit, a short circuit may be provided as an input impedance of the first port which is equivalently connected to the first circuit in parallel.

In the short mode of the series connection mode of the first cross-coupled switch circuit, the first cross-coupled element may be a first cross-coupled switch, the second cross-coupled element may be a second cross-coupled switch, the first series switch and the second series switch may be turned on, and the first cross-coupled switch and the second cross-coupled switch may be turned on.

Based on operating modes of the first cross-coupled switch circuit and the second cross-coupled switch circuit, a parallel combined impedance of an externally expressed circuit by the second circuit or a parallel impedance excluding an influence of the second circuit may be provided as a first input impedance of the first port and a second input impedance of the second port which are equivalently connected to the first circuit in parallel.

An equivalent capacitance of each of the first series switch and the second series switch may be implemented to be equal to an equivalent capacitance of each of the first cross-coupled element and the second cross-coupled element.

A combined capacitance twice the equivalent capacitance of each of the first cross-coupled element and the second cross-coupled element or a parallel combined impedance of the externally expressed circuit by the second circuit and the combined capacitance may be provided as the input impedance of the first port which is equivalently connected to the first circuit in parallel.

In accordance with the present disclosure, it is possible to provide an effective implementation technique of a reconfigurable circuit for multi-band, multi-mode operations where independent design is difficult due to isolation degradation caused by $C_{off}$ which is a parasitic capacitance of series-connected switches.

In accordance with the present disclosure, when a variable circuit requiring high isolation is implemented, a device for offsetting $C_{off}$, which is a parasitic capacitance, can be implemented using a passive element or switch occupying a minimum area. In this case, a reconfigurable circuit having high isolation can be implemented using a pair of cross-coupled capacitors or a pair of cross-coupled switches.

In accordance with the present disclosure, in implementing a reconfigurable circuit including a switch providing high isolation in a wide frequency band, the reconfigurable circuit can be implemented while minimizing an additional circuit for frequency band characteristics or high isolation.

In accordance with the present disclosure, since the additional circuit has a simplified structure, a reconfigurable circuit having high isolation can be implemented without insertion loss (power loss caused by the addition of an element).

The reconfigurable circuit according to the present disclosure can be actively utilized in a high-frequency reconfigurable circuit which is essential to cover multi-band or support multi-mode.

DETAILED DESCRIPTION OF THE EMBODIMENTS

Figure 1:
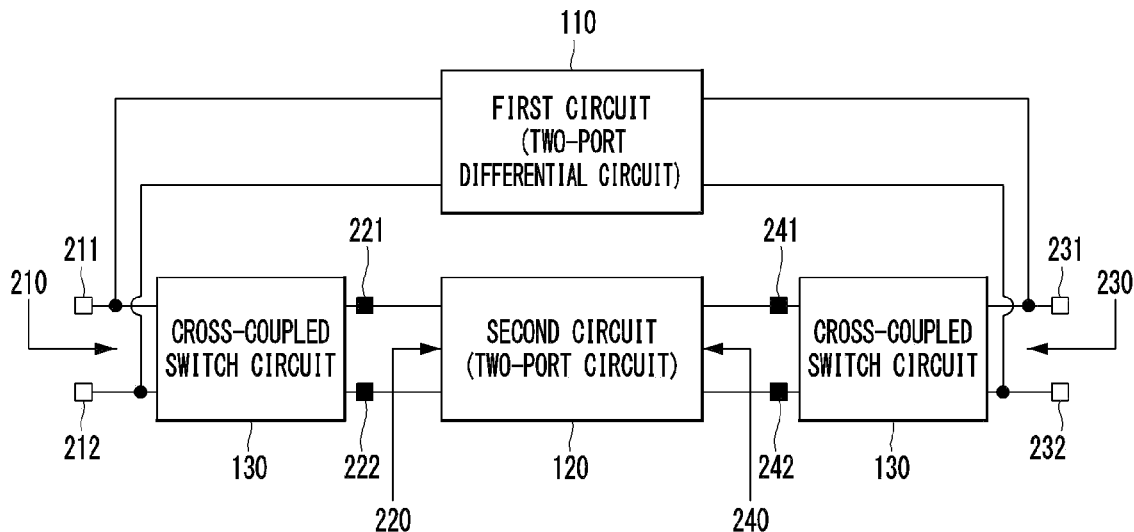
FIG. 1 is a conceptual diagram illustrating a reconfigurable circuit of a differential network according to one embodiment of the present disclosure.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, even a technology known before the filing date of the present application may be included as a part of the configuration of the present disclosure when necessary, and will be described herein without obscuring the spirit of the present disclosure. However, in describing the configuration of the present disclosure, the detailed description of a technology known before the filing date of the present application that those of ordinary skill in the art can clearly understand may obscure the spirit of the present disclosure, and thus a detailed description of the related art will be omitted.

For example, impedance matching for configuring a differential transmission line, and design technology for matching the size and characteristics between facing switches may use known technologies prior to filing the application of the present disclosure, and at least some of these known technologies may be applied as an elemental technology necessary for implementing the present disclosure.

However, the purpose of the present disclosure is not to claim the rights to these known technologies, and the contents of the known technologies may be included as part of the present disclosure within the scope not departing from the spirit of the present disclosure.

Hereinafter, exemplary embodiments of the present disclosure will be described in detail with reference to the accompanying drawings. In order to facilitate a thorough understanding of the present disclosure, the same reference numbers are used for the same components in the drawings and an overlapping description for the same components will be omitted.

FIG. 1 is a conceptual diagram illustrating a reconfigurable circuit of a differential network according to one embodiment of the present disclosure.

The reconfigurable circuit of a differential network according to one embodiment of the present disclosure includes: a first circuit 110, which is a two-port differential circuit; a first cross-coupled switch circuit 130 connected to a first port 210 on one side of the first circuit 110 in parallel; and a second circuit 120 connected to a second port 220 on the other side of the first cross-coupled switch circuit 130 in series. The first cross-coupled switch circuit 130 includes: a first series switch M1 connecting a first terminal 211 of the first port 210 and a first terminal 221 of the second port 220 in series; a second series switch M2 connecting a second terminal 212 of the first port 210 and a second terminal 222 of the second port 220 in series; a first cross-coupled element disposed between and connected to the first terminal 211 of the first port 210 and the second terminal 222 of the second port 220; and a second cross-coupled element disposed between and connected to the second terminal 212 of the first port 210 and the first terminal 221 of the second port 220.

The reconfigurable circuit of a differential network according to one embodiment of the present disclosure may further include a second cross-coupled switch circuit 130 connected to a third port 230 on the other side of the first circuit 110 in parallel.

In this case, the second circuit 120 may be disposed between and connected to the first cross-coupled switch circuit 130 and the second cross-coupled switch circuit 130 in series.

The reconfigurable circuit of a differential network according to one embodiment of the present disclosure may provide a parallel combined impedance of an externally expressed circuit by the second circuit 120 or may provide a parallel impedance from which an influence of the second circuit 120 is excluded (not included) as an input impedance of the first port 210, which is equivalently connected to the first circuit 110 in parallel, based on an operating mode of the first cross-coupled switch circuit 130.

In the series connection modes of the first cross-coupled switch circuit 130, a parallel combined impedance of the externally expressed circuit by the second circuit 120 and an equivalent capacitance may be provided as an input impedance of the first port 210 equivalently connected to the first circuit 110.

In a first series connection mode of the series connection modes of the first cross-coupled switch circuit 130, the second circuit 120 may be provided as the externally expressed circuit, and a parallel combined impedance of the second circuit 120 and an equivalent capacitance may be provided as the input impedance of the first port 210.

In the first series connection mode of the series connection modes of the first cross-coupled switch circuit 130, the first cross-coupled element may be a first cross-coupled capacitor $C_{cross}$, and the second cross-coupled element may be a second cross-coupled capacitor $C_{cross}$.

In the first series connection mode of the series connection modes of the first cross-coupled switch circuit 130, the first series switch M1 and the second series switch M2 may be turned on.

In the first series connection mode of the series connection modes of the first cross-coupled switch circuit 130, the first cross-coupled element may be a first cross-coupled switch M4, and the second cross-coupled element may be a second cross-coupled switch M3.

In the first series connection mode of the series connection modes of the first cross-coupled switch circuit 130, the first series switch M1 and the second series switch M2 may be turned on, and the first cross-coupled switch M4 and the second cross-coupled switch M3 may be turned off.

In a second series connection mode of the series connection modes of the first cross-coupled switch circuit 130, a circuit having a topology in which the second circuit 120 is inverted at 180 degrees may be provided as the externally expressed circuit, and a parallel combined impedance of the inverted circuit of the second circuit 120 and an equivalent capacitance may be provided as the input impedance of the first port 210.

In the second series connection mode of the series connection modes of the first cross-coupled switch circuit 130, the first cross-coupled element may be the first cross-coupled switch M4, and the second cross-coupled element may be the second cross-coupled switch M3.

In the second series connection mode of the series connection modes of the first cross-coupled switch circuit 130, the first series switch M1 and the second series switch M2 may be turned off, and the first cross-coupled switch M4 and the second cross-coupled switch M3 may be turned on.

In an open mode of the first cross-coupled switch circuit 130, a parallel impedance of the equivalent capacitance from which the influence of the second circuit 120 is excluded (not included) may be provided as the input impedance of the first port 210 equivalently connected to the first circuit 110 in parallel.

In the open mode of the series connection modes of the first cross-coupled switch circuit 130, the first cross-coupled element may be the first cross-coupled capacitor $C_{cross}$, the second cross-coupled element may be the second cross-coupled capacitor $C_{cross}$, and the first series switch M1 and the second series switch M2 may be turned off.

In the open mode of the series connection modes of the first cross-coupled switch circuit 130, the first cross-coupled element may be the first cross-coupled switch M4, and the second cross-coupled element may be the second cross-coupled switch M3. In this case, the first series switch M1 and the second series switch M2 may be turned off, and the first cross-coupled switch M4 and the second cross-coupled switch M3 may be turned on.

In a short-circuit mode of the first cross-coupled switch circuit 130, a short circuit may be provided as the input impedance of the first port 210 equivalently connected to the first circuit 110 in parallel.

In the short-circuit mode of the series connection modes of the first cross-coupled switch circuit 130, the first cross-coupled element may be the first cross-coupled switch M4, and the second cross-coupled element may be the second cross-coupled switch M3. In this case, the first series switch M1 and the second series switch M2 may be turned on, and the first cross-coupled switch M4 and the second cross-coupled switch M3 may be turned on.

The reconfigurable circuit of a differential network according to one embodiment of the present disclosure may provide a parallel combined impedance of the externally expressed circuit by the second circuit 120 or may provide a parallel impedance from which the influence of the second circuit 120 is excluded (not included) as a first input impedance and a second input impedance of the first port 210 and the second port 220, which are equivalently connected to the first circuit 110 in parallel, based on operating modes of the first cross-coupled switch circuit 130 and the second cross-coupled switch circuit 130.

The switch block (including the first cross-coupled switch circuit, 130) may be referred to as a series differential switch or simply a switch. In addition, as one example of the above-described two-port differential network, a differential transmission line may be implemented as a waveguide or a microstrip line, but the present disclosure is not limited thereto.

In the reconfigurable circuit of the differential network according to one embodiment of the present disclosure, the equivalent capacitance $C_{off}$ of each of the first series switch M1 and the second series switch M2 may be implemented to be the same as the equivalent capacitance $C_{cross}$ of each of the first cross-coupled element and the second cross-coupled element.

In the open mode of the series differential switch in the reconfigurable circuit of a differential network according to one embodiment of the present disclosure, in order to maximize the isolation of the second circuit 120, the equivalent capacitance $C_{cross}$ of each of the first cross-coupled element and the second cross-coupled element may be designed to be the same as the equivalent capacitance $C_{off}$ of each of the first series switch M1 and the second series switch M2. Since the parasitic capacitance of each of first series switch M1 and second series switch M2 occupies most of the equivalent capacitance $C_{off}$ of each of first series switch M1 and second series switch M2, $C_{off}$ may be determined according to the width and length of a metal oxide semiconductor field effect transistor (MOSFET) constituting each of the first series switch M1 and the second series switch M2.

When the first cross-coupled element and the second cross-coupled element are the cross-coupled switches M3 and M4, $C_{cross}$ may be determined according to the width and length of each of the cross-coupled switches M3 and M4. When the first cross-coupled element and the second cross-coupled element are cross-coupled capacitors, $C_{cross}$ may be determined based on the size of each capacitor.

In this case, in the reconfigurable circuit of a differential network according to one embodiment of the present disclosure, as the input impedance of the first port 210 equivalently connected to the first circuit 110 in parallel, a combined capacitance $2*C_{cross}$ twice the equivalent capacitance $C_{cross}$ of each of the first cross-coupled element and the second cross-coupled element is provided, or a parallel combined impedance of the externally expressed circuit by the second circuit 120 and the combined capacitance $2*C_{cross}$ may be provided.

The first circuit 110 may be a two-port differential circuit. The second circuit 120 is not necessarily a differential circuit, and may be any two-port circuit.

When the first cross-coupled switch circuit 130 is in the series connection mode, the first port 210 is equivalently observed in a state in which the first circuit 110 and the second circuit 120 (or the externally expressed circuit having a topology in which the second circuit 120 is inverted depending on the operating mode) are connected in parallel. In this case, the combined capacitance by the elements of the cross-coupled switch circuit 130 may be combined in parallel and reflected in the equivalent impedance.

When the first cross-coupled switch circuit 130 is in the open mode, in the first port 210, the combined capacitance by the elements of the first circuit 110 and the cross-coupled switch circuit 130 may be combined in parallel and reflected in the equivalent impedance. In this case, the influence of the second circuit 120 is not observed in the first port 210.

Similarly, when the second cross-coupled switch circuit 130 is in the series connection mode, the third port 230 is equivalently observed in a state in which the first circuit 110 and the second circuit 120 (or the externally expressed circuit having a topology in which the second circuit 120 is inverted depending on the operating mode) are connected in parallel. In this case, the combined capacitance by the elements of the cross-coupled switch circuit 130 may be combined in parallel and reflected in the equivalent impedance.

When the second cross-coupled switch circuit 130 is in the open mode, in the third port 230, the combined capacitance by the elements of the first circuit 110 and the cross-coupled switch circuit 130 may be combined in parallel and reflected in the equivalent impedance. In this case, the influence of the second circuit 120 is not observed in the third port 230.

The operations of the first cross-coupled switch circuit and the second cross-coupled switch circuit may be performed independently, and thus the second circuit 120 may be observed only at the first port 210 or observed only at the third port 230 and may be operated so as to be observed or not observed at both of the first port 210 and third port 230.

The present disclosure relates to a method of configuring a circuit including a crossed switch of a radio frequency integrated circuit for a high frequency system. Specifically, according to an embodiment of the present disclosure, a reconfigurable circuit may be implemented independently by arranging a crossed switch, which provides switch isolation using a cross-coupled switch or capacitor, at an end or a branch point of the network and using a side opposite to the crossed switch when the crossed switch is turned off, and based on the above description, a circuit required for a multi-mode may be implemented.

Figure 2:
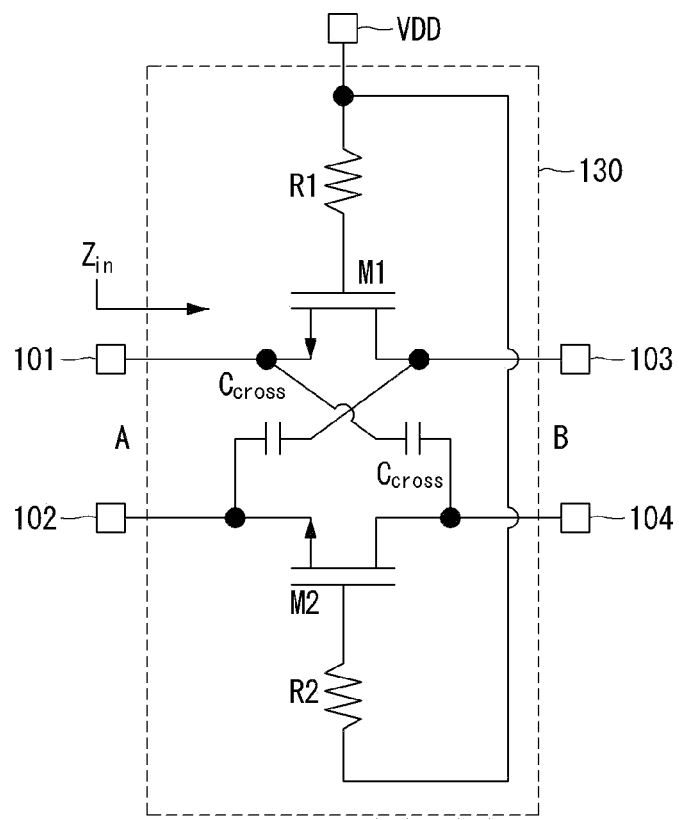
FIG. 2 is a circuit diagram illustrating a cross-coupled switch circuit according to one embodiment of the present disclosure.

FIG. 2 is a circuit diagram illustrating a cross-coupled switch circuit according to one embodiment of the present disclosure.

Referring to FIG. 2, as shown in FIG. 2, the switch block 130 of FIG. 1 may include a first switch M1 disposed between and connected to a first terminal 101 and a third terminal 103 in series, a second switch M2 disposed between and connected to a second terminal 102 and a fourth terminal 104 in series, a first cross capacitor $C_{cross}$ disposed between and connected to the first terminal 101 of an input port A and the fourth terminal 104 of an output port B when the switch block 130 is considered to be a two-port network, and a second cross capacitor $C_{cross}$ disposed between and connected to the second terminal 102 of the input port A and the third terminal 103 of the output port B.

A control terminal of the first switch M1 is connected to a power supply voltage VDD through a first resistor R1, and a control terminal of the second switch M2 is connected to the power supply voltage VDD through a second resistor R2. Alternatively, according to types of switches (N-type metal-oxide-semiconductor (NMOS)/P-type MOS (PMOS)), the control terminal of each switch may be connected to a ground or another power supply voltage terminal. Another power supply voltage may have a voltage level that is smaller than that of the power supply voltage VDD by a certain amount and may be referred to as VSS or the like. The first switch M1 and the second switch M2 may each include a thin-film transistor.

The cross-coupled switch circuit 130 employing the circuit of FIG. 2 may respond to two operating modes including a series connection mode in which the second circuit 120 is observed next to the cross-coupled switch circuit 130, and an open mode in which the second circuit 120 is not observed next to the cross-coupled switch circuit 130.

When the circuit of FIG. 2 is applied to the first cross-coupled switch circuit 130 of FIG. 1, for convenience of description, it can be regarded that the port A corresponds to the first port 210 and the port B corresponds to the second port 220.

Figure 3:
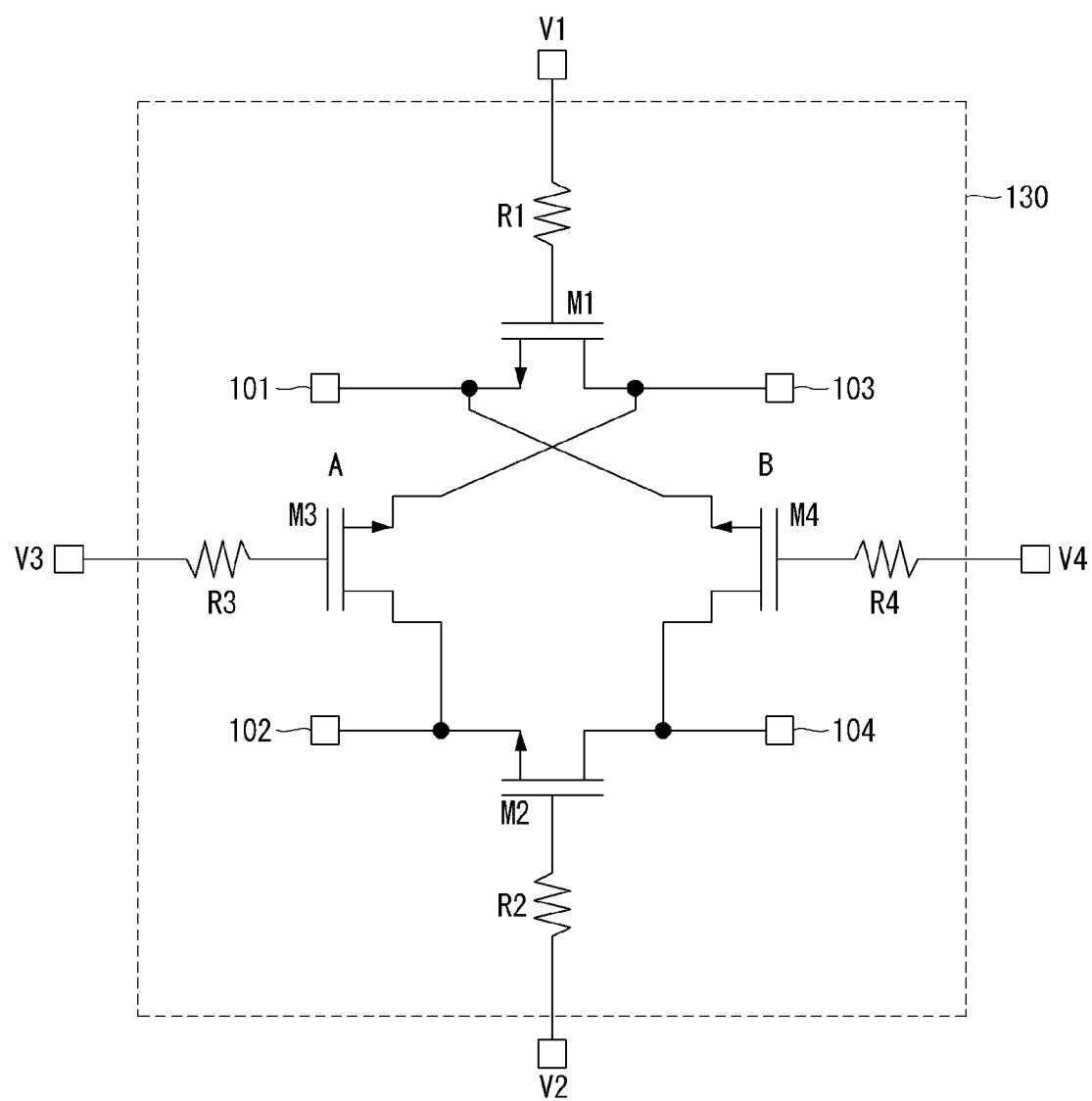
FIG. 3 is a circuit diagram illustrating a cross-coupled switch circuit according to another embodiment of the present disclosure.

FIG. 3 is a circuit diagram illustrating a cross-coupled switch circuit according to another embodiment of the present disclosure.

Referring to FIG. 3, a switch block 130 may include a first switch M1 disposed between and connected to a first terminal 101 and a third terminal 103 in series, a second switch M2 disposed between and connected to a second terminal 102 and a fourth terminal 104 in series, a first cross-coupled switch M4 disposed between and connected to the first terminal 101 of an input port A and the fourth terminal 104 of an output port B when the switch block 130 is considered to be a two-port network, and a second cross-coupled switch M3 disposed between and connected to the second terminal 102 of the input port A and the third terminal 103 of the output port B.

A control terminal of first switch M1 may be connected to a first power supply voltage V1 through a first resistor R1, a control terminal of the second switch M2 may be connected to a second power supply voltage V2 through a second resistor R2, a control terminal of the second cross-coupled switch M3 may be connected to a third power supply voltage V3 through a third resistor R3, and a control terminal of the first cross-coupled switch M4 may be connected to a fourth power supply voltage V4 through a fourth resistor R4. Alternatively, according to types of switches (NMOS/PMOS), the control terminal of each switch may be connected to a ground or a terminal of a power supply voltage at another level. Another power supply voltage may have a voltage level that is smaller than that of the power supply voltage VDD by a certain amount and may be referred to as VSS or the like. The first to fourth switches M1 to M4 may each be implemented as a thin-film transistor.

The switch structure according to the embodiment of FIG. 3 may be designed to be optimized using an off capacitance, which is a parasitic capacitance of the switch, instead of the cross-coupled capacitor $C_{cross}$ of FIG. 2.

This switch may be configured to use a parasitic capacitor or a parasitic capacitance of a semiconductor switch such as a MOSFET.

A state of the switch block may be controlled as shown in the following Table 1 by controlling the first, second, third, and fourth power supply voltages V1, V2, V3, and V4.

TABLE 1

| V1 | V2 | V3 | V4 | Switch block state |
|----|----|----|----|--------------------|
| 0  | 0  | 0  | 0  | open               |
| 1  | 1  | 0  | 0  | 0 degrees          |
| 0  | 0  | 1  | 1  | 180 degrees        |
| 1  | 1  | 1  | 1  | short              |

As shown in Table 1, a value of 0 or 1 of each power supply voltage may correspond to an intensity of a voltage or current for deactivation or activation of a corresponding switch. The activation may correspond to a turn-on level of the switch, and the deactivation may correspond to a turn-off level of the switch. As one example, when the first switch M1 and the second switch M2 of the switch block are turned off and the third switch M3 and the fourth switch M4 are also turned off, the switch block may be controlled to be in an open state. In addition, when the first switch M1 and the second switch M2 are turned on and the third switch M3 and the fourth switch M4 are turned off, the switch block may be controlled to be in a first series mode of a 0° (degrees) phase. In addition, when the first switch M1 and the second switch M2 are turned off and the third switch M3 and the fourth switch M4 are turned on, the switch block may be controlled to be in a second series mode of a 180° phase (topology inversion). In addition, when the first switch M1 and the second switch M2 are turned on and the third switch M3 and the fourth switch M4 are also turned on, the switch block may be controlled to be in a short state.

That is, as shown in Table 1, when the circuit shown in FIG. 3 is used, the switch block may be controlled to be in any one state among the open state, the 0° phase state (the first series connection mode), the 180° phase state (inversion and the second series connection mode), and the short state according to the operating states of the first to fourth switches due to application of the first to fourth power supply voltages V1, V2, V3, and V4. In this case, the phase means whether the topology of the second circuit 120 is inverted, the 0° phase means a non-inverted topology, and the 180° phase means that the second circuit 120 is observed next to the switch 130 through the inverted topology.

According to the present embodiment, a switch-off capacitance, which is a parasitic component generated in the first and second switches, is offset by the parasitic capacitance of the third switch and the fourth switch, and thus an impedance viewed from one end when viewed from the other end of the switch or an impedance viewed from the other end when viewed from one end of the switch has a very large value so that isolation between both ends of the switch may be formed very large.

As described above, according to the present embodiment, when the switch block is opened, a reconfigurable circuit may be configured so as to hardly affect different circuits connected to both ends of the switch block 130. That is, in the open mode, when viewed from the first circuit 110, the second circuit 120 may be treated as if it is not present from the beginning, and in the series connection mode, the second circuit 120 may be observed by the non-inverted or inverted topology.

Unlike the configuration in which the capacitor of the lumped element is used to offset the off capacitance of the capacitor in the method of another embodiment described above, the method of the present embodiment is implemented such that a cross-coupled capacitor is not configured using a lumped element, but is configured using a semiconductor switch such as a MOSFET so that each pair is connected as a cross-coupled pair to offset the off capacitance $C_{off}$. The semiconductor switch or the cross capacitor may be referred to as a cross-coupled element or included in a cross-coupled element.

According to the above configuration, as shown in Table 1 above, the impedance of the switch block exhibiting according to the control voltage of each switch is not only open and short, but also, when an existing signal has a 0 degree phase, the impedance may be implemented as a 180 degree phase, which is advantageous in implementing a phase shifter.

In addition, when the switch block of the embodiment of FIG. 3 is applied to another embodiment of the present disclosure, since other impedance ECT1 and other impedance ECT2 may be additionally expressed, it is expected that the switch block may also be used for a reflection type phase shifter (RTPS).

Figure 4:
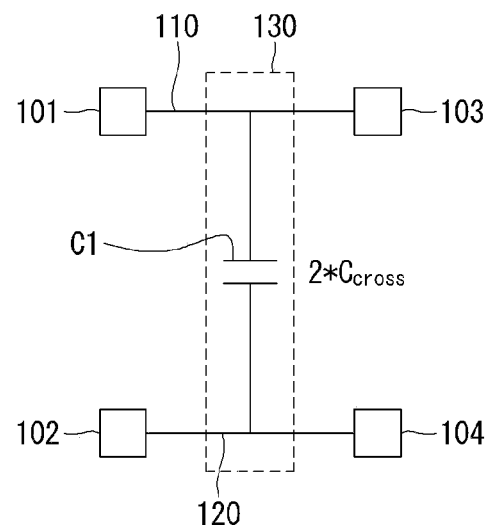
FIG. 4 is a conceptual diagram illustrating an equivalent circuit in a switch on state (a series connection mode) for describing the operation of the cross-coupled switch circuit according to one embodiment of the present disclosure.

FIG. 4 is a conceptual diagram illustrating an equivalent circuit in a switch on state (a series connection mode) for describing the operation of the cross-coupled switch circuit according to one embodiment of the present disclosure.

Referring to FIG. 4, when the first switch M1 and the second switch M2 are turned on according to a voltage level VDD or a current level in the switch block 130, the switch block 130 may be represented by an equivalent circuit in which a parallel capacitor C1 with doubled cross capacitance $2*C_{cross}$ serves as a capacitance C on one side of a transmission line with a lumped element composed of C-L-C between a first port A and a second port B.

Figure 5:
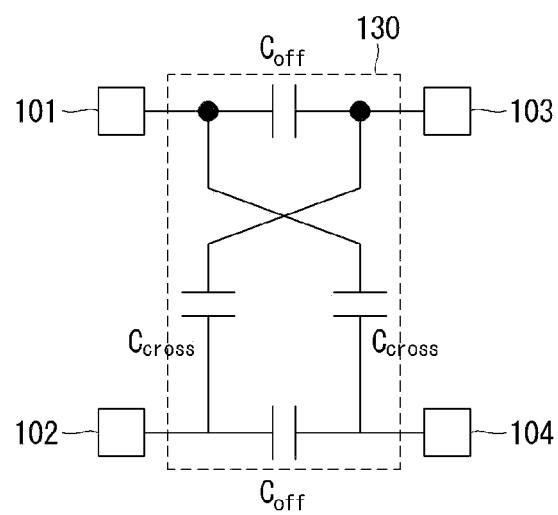
FIG. 5 is a conceptual diagram illustrating an equivalent circuit in a switch off state for describing the operation of the cross-coupled switch circuit according to one embodiment of the present disclosure.

FIG. 5 is a conceptual diagram illustrating an equivalent circuit in a switch off state for describing the operation of the cross-coupled switch circuit according to one embodiment of the present disclosure.

Referring to FIG. 5, when the first switch M1 and the second switch M2 are turned off according to the voltage level of VDD or the current level in the switch block 130, the switch block 130 may be represented by an equivalent circuit having two cross capacitances $C_{cross}$ and two switch off capacitances $C_{off}$.

That is, as shown in FIG. 5, the switch block 130 may be represented by an equivalent circuit including a switch off capacitance $C_{off}$ formed at a position of the first switch M1, another switch off capacitance $C_{off}$ formed at a position of the second switch M2, and two cross capacitances $C_{cross}$.

In this way, when the first switch M1 and the second switch M2 of the switch block 130 are turned off, since the switch off capacitance, which is a parasitic component generated by each switch, is offset by the cross capacitance, the impedance viewed from one end when viewed from the other end of the switch or the impedance viewed from the other end when viewed from one end of the switch has a very large value so that isolation between both ends of the switch may be formed very large.

According to the embodiment of the present disclosure, when the first circuit 110 is a differential circuit and the switch block 130 is opened, a reconfigurable circuit may be implemented so as to hardly affect different circuits connected to both ends of the switch block 130. That is, when viewed from the first circuit 110, the second circuit 120 may be regarded as if it is not present from the beginning.

To this end, in the embodiment of the present disclosure, the cross-coupled capacitance required to form a reconfigurable circuit may be calculated, and the width and length of each switch may be determined to allow the doubled cross-coupled capacitance to appropriately offset the switch-off capacitance.

Figure 6:
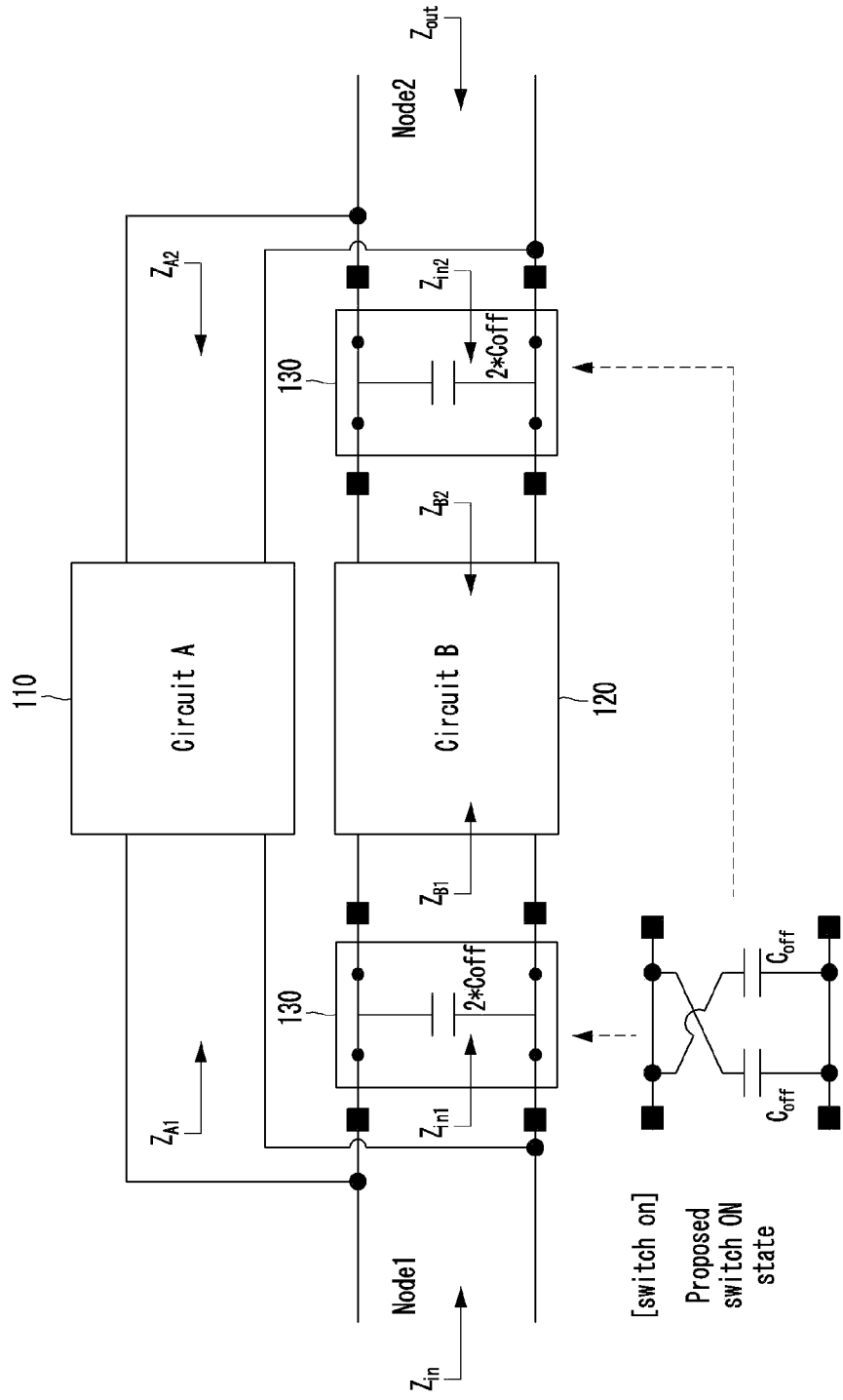
FIG. 6 is a conceptual diagram illustrating a series connection mode among operating modes of the reconfigurable circuit of a differential network according to one embodiment of the present disclosure together with an equivalent circuit.

FIG. 6 is a conceptual diagram illustrating a series connection mode among operating modes of the reconfigurable circuit of a differential network according to one embodiment of the present disclosure together with an equivalent circuit.

In FIG. 6, when a series differential cross-coupled switch circuit 130 is turned on, both ends of the series switches M1 and M2 may be connected and a shunt capacitance twice as large as $C_{off}$ may be equivalently observed at an external port.

In this case, an equivalent impedance satisfying relationships of $Z_{in}=(Z_{in1}||Z_{A1})$ and $Z_{out}=(Z_{in2}||Z_{A2})$ may be observed at the external port.

Figure 7:
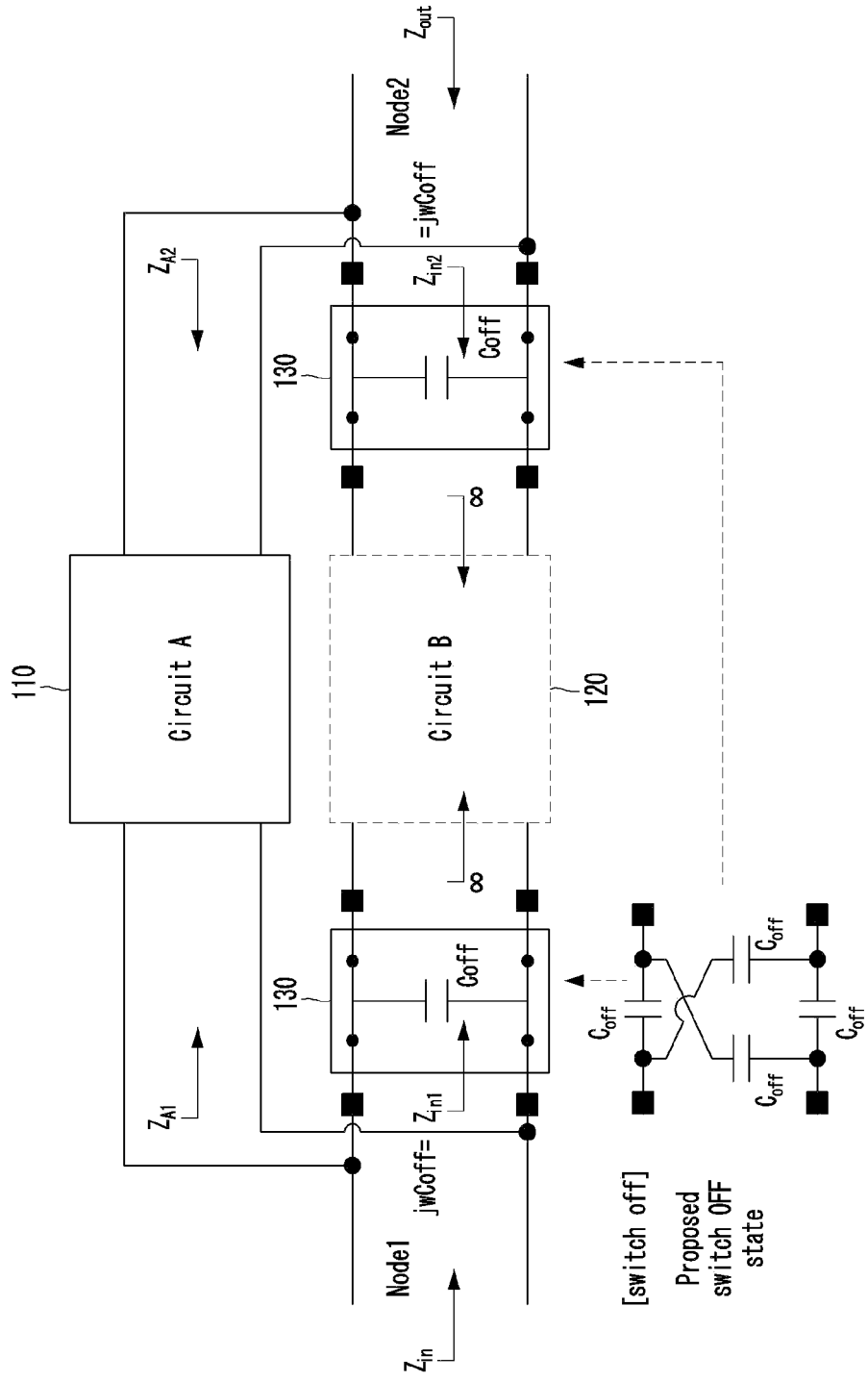
FIG. 7 is a conceptual diagram illustrating an open mode among the operating modes of the reconfigurable circuit of a differential network according to one embodiment of the present disclosure together with an equivalent circuit.

FIG. 7 is a conceptual diagram illustrating an open mode among the operating modes of the reconfigurable circuit of a differential network according to one embodiment of the present disclosure together with an equivalent circuit.

In FIG. 7, when the series differential/cross-coupled switch circuit 130 is turned off, an equivalent circuit composed of four parasitic capacitances is formed, and since a signal having a phase exactly opposite to a phase of a signal passing through $C_{off}$ passes through the cross-coupled capacitance and thus the two signals are offset, the second circuit 120 is not observed next to the switch 130.

In this case, a shunt capacitance as large as $C_{off}$ is observed as the equivalent impedance observed at the ports at both ends ($Z_{in1}=jwC_{off}$), but the second circuit 120 next to the switch 130 does not affect $Z_{in1}$ no matter what circuit is implemented. Since independent impedances not affecting each other may be implemented with only a cross-coupled switch, which is a simple circuit, it can be seen that this circuit is a structure suitable for configuring the reconfigurable circuit. Here, a $C_{off}$ value is determined by the size of a MOSFET constituting the switch 130.

Referring to FIGS. 6 and 7 together, in FIG. 6, the impedance by the cross-coupled switch is based on a shunt capacitance $2*C_{off}$, and the impedance of the second circuit 120 next to the switch 130 is observed, and in FIG. 7 the observed impedance is based on shunt capacitance $C_{off}$, and the impedance of the second circuit 120 next to the switch 130 is not observed.

By using these characteristics, the first circuit 110 and the second circuit 120 may be configured in various ways to configure a reconfigurable circuit for multi-band and multi-mode.

Figure 8:
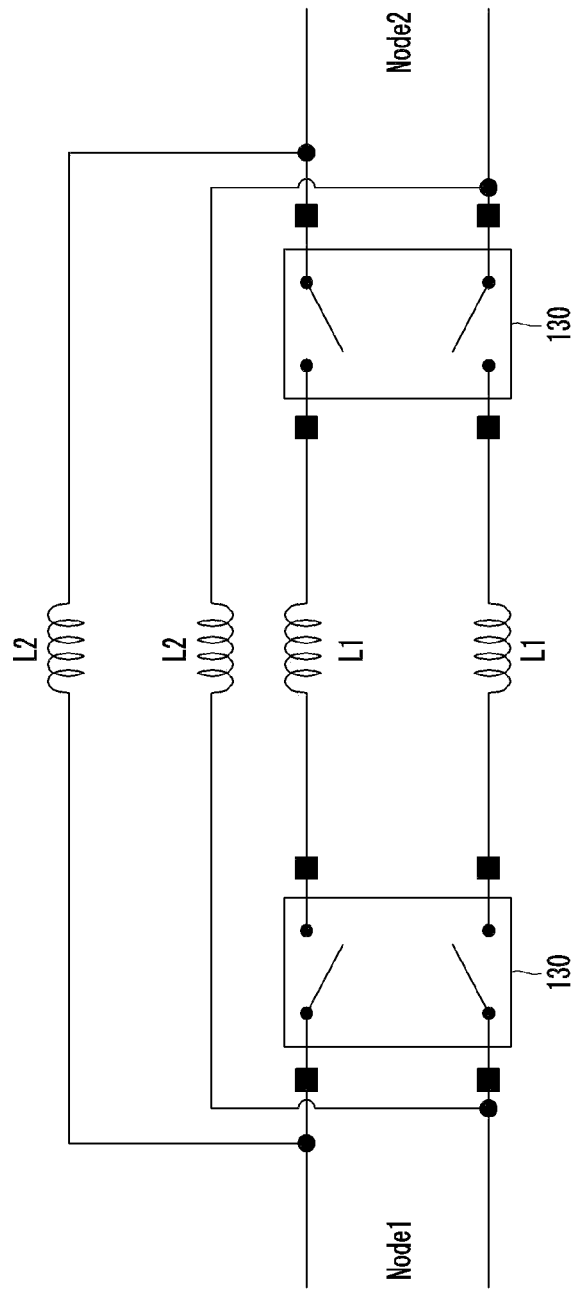
FIG. 8 is a conceptual diagram illustrating a dual-band transmission line using the reconfigurable circuit of a differential network according to one embodiment of the present disclosure.

FIG. 8 is a conceptual diagram illustrating a dual-band transmission line using the reconfigurable circuit of a differential network according to one embodiment of the present disclosure.

In a circuit of FIG. 8, the first circuit 110 may be composed of a pair of series inductors L2, and the second circuit 120 may be composed of a pair of series inductors L1.

Referring to the differential transmission line of FIG. 8, a transmission line including a switch with high isolation may be proposed by offsetting $C_{off}$ when the switch is turned off using a cross-coupled capacitor or a pair of cross-coupled switches in the series differential switch 130 and implementing the transmission line to operate such as a lumped transmission line having an equivalent circuit of shunt C-series L-shunt C using a shunt capacitance generated when series switches are turned on.

In addition, referring to FIG. 8, the advantage that a signal isolation over the series differential switch 130 may be guaranteed within a wide frequency band may be highly utilized. The series differential switch 130 may be coupled with additional circuits utilizing the advantage. Therefore it is proposed that a generalized reconfigurable circuit may be effectively configured, and as a specific embodiment, the design of a transmission line capable of varying $Z_0$, which will be described below in FIG. 13, may be proposed.

When the differential transmission line of FIG. 8 is used, it is easier to reduce electromagnetic interference (EMI) emission and remove common mode noise compared to using a single transmission line, and the differential transmission line may be effectively applied to an interface of hardware for high-speed processing of a gigahertz (GHz) level. In particular, the differential transmission line is applied to signal transmission standards such as low voltage differential signaling (LVDS) and ground LVDS (GLVDS), and thus, has an effect of providing high isolation between both ends of the switch through the switch block 130 together with a low power consumption characteristic.

Figure 9:
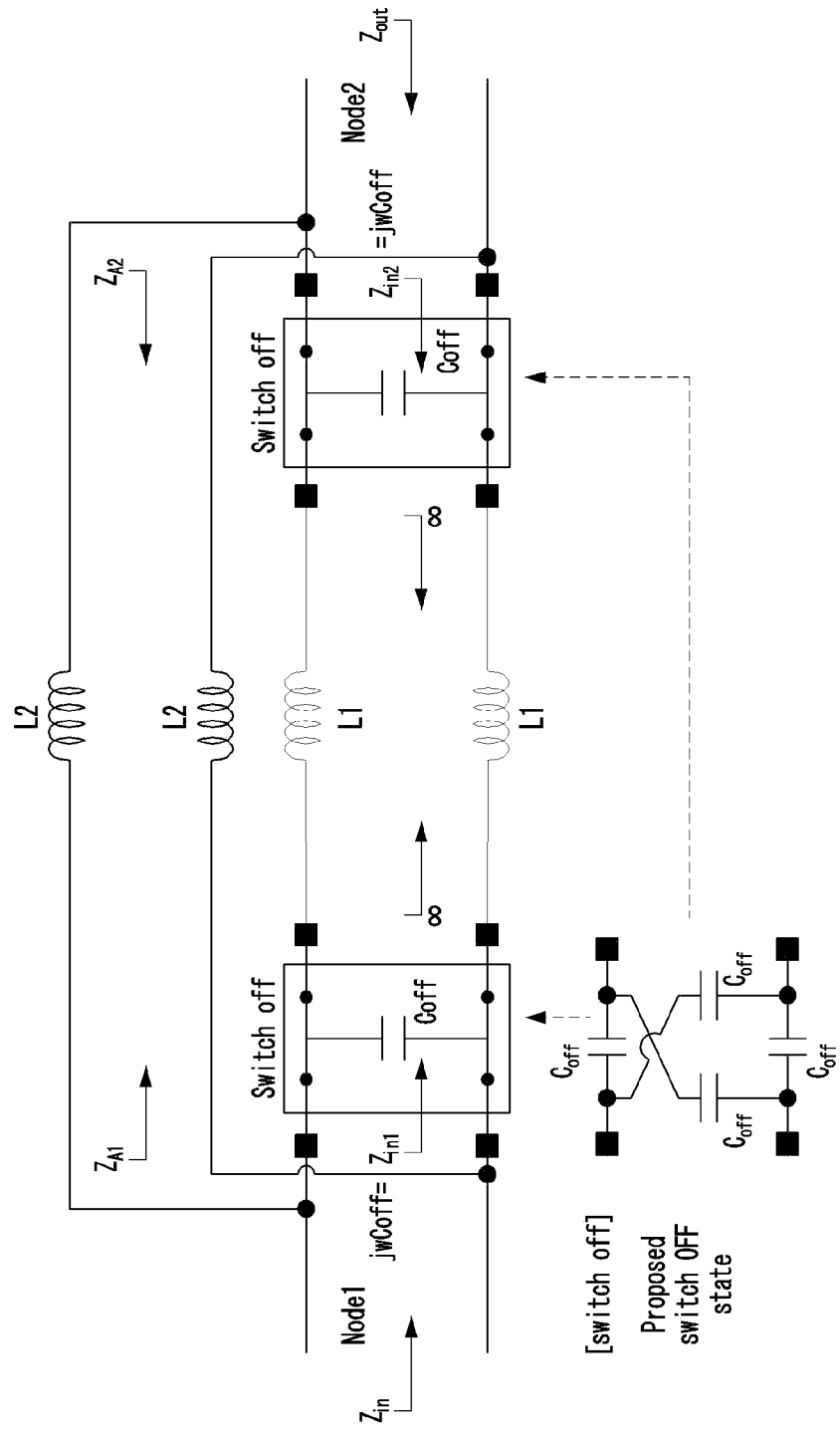
FIG. 9 is a conceptual diagram illustrating an open mode among operating modes of a dual-band transmission line using the reconfigurable circuit of a differential network according to one embodiment of the present disclosure together with an equivalent circuit.

FIG. 9 is a conceptual diagram illustrating an open mode among operating modes of a dual-band transmission line using the reconfigurable circuit of a differential network according to one embodiment of the present disclosure together with an equivalent circuit.

Figure 10:
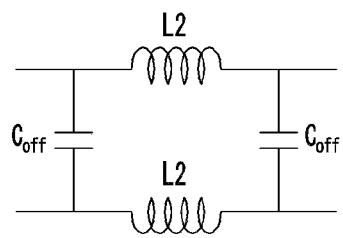
FIG. 10 is a schematic conceptual diagram illustrating an equivalent impedance of FIG. 9.

FIG. 10 is a schematic conceptual diagram illustrating an equivalent impedance of FIG. 9.

Referring to FIG. 9, when the switch 130 is in the open mode, that is, in a switch off state, an influence of the L1 pair is not observed from the outside and an equivalent circuit shown in FIG. 10 is equivalently observed.

Figure 11:
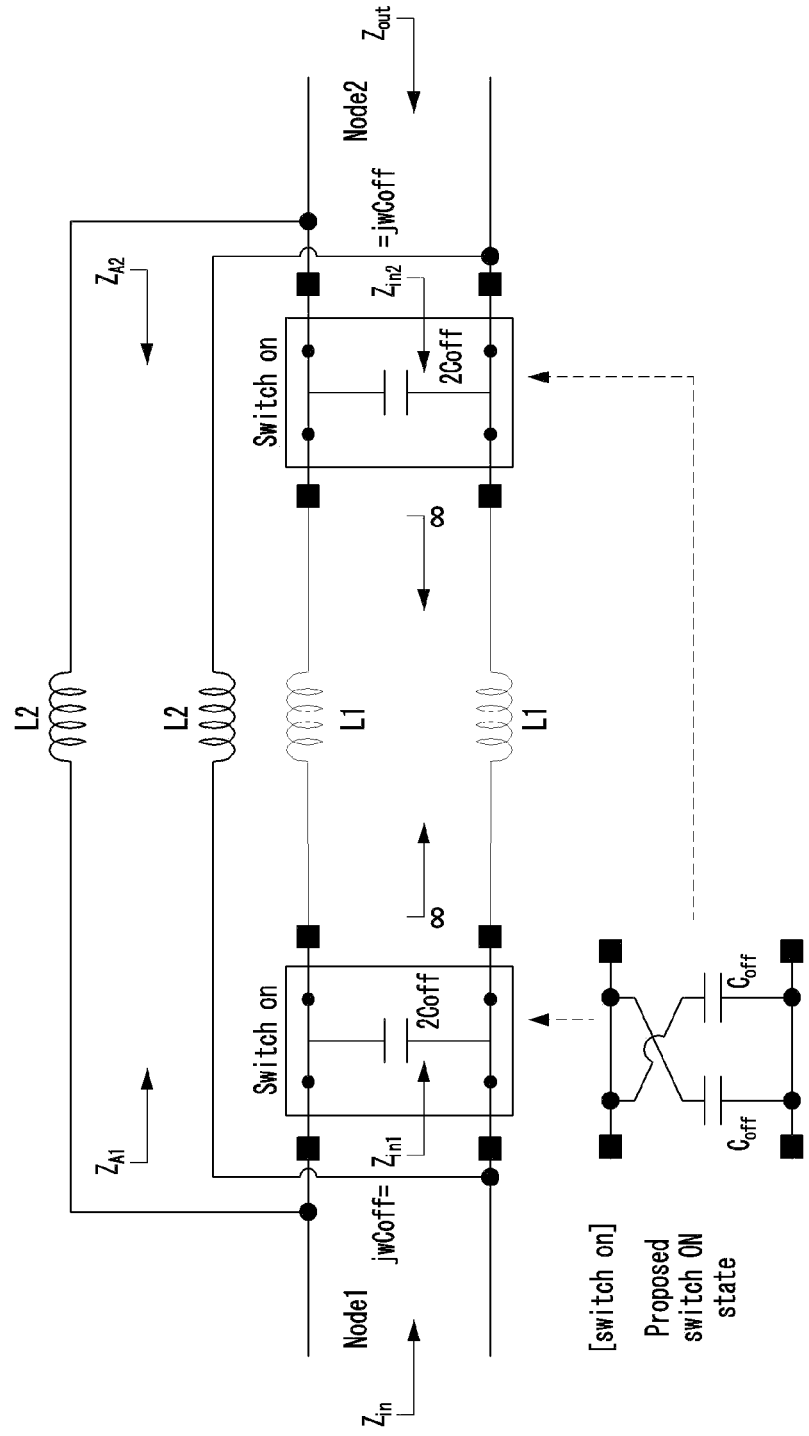
FIG. 11 is a conceptual diagram illustrating a series connection mode among the operating modes of the dual-band transmission line using the reconfigurable circuit of a differential network according to one embodiment of the present disclosure together with an equivalent circuit.

FIG. 11 is a conceptual diagram illustrating a series connection mode among the operating modes of the dual-band transmission line using the reconfigurable circuit of a differential network according to one embodiment of the present disclosure together with an equivalent circuit.

Figure 12:
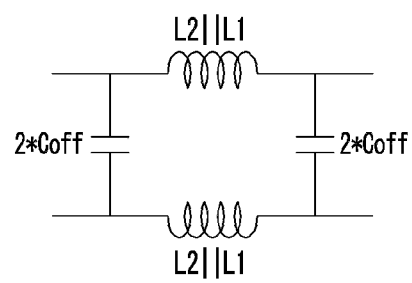
FIG. 12 is a schematic conceptual diagram illustrating an equivalent impedance of FIG. 11.

FIG. 12 is a schematic conceptual diagram illustrating an equivalent impedance of FIG. 11.

Referring to FIG. 11, when the switch 130 is in the series connection mode, that is, in a state in which a series switch is turned on, an influence of the L1 pair is observed from the outside and an equivalent circuit shown in FIG. 12 is equivalently observed.

Figure 13:
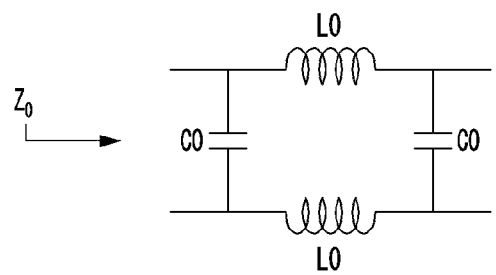
FIG. 13 is a diagram illustrating a characteristic impedance and L and C values of a differential lumped transmission line according to one embodiment of the present disclosure.

FIG. 13 is a diagram illustrating a characteristic impedance and L and C values of a differential lumped transmission line according to one embodiment of the present disclosure.

Figure 14:
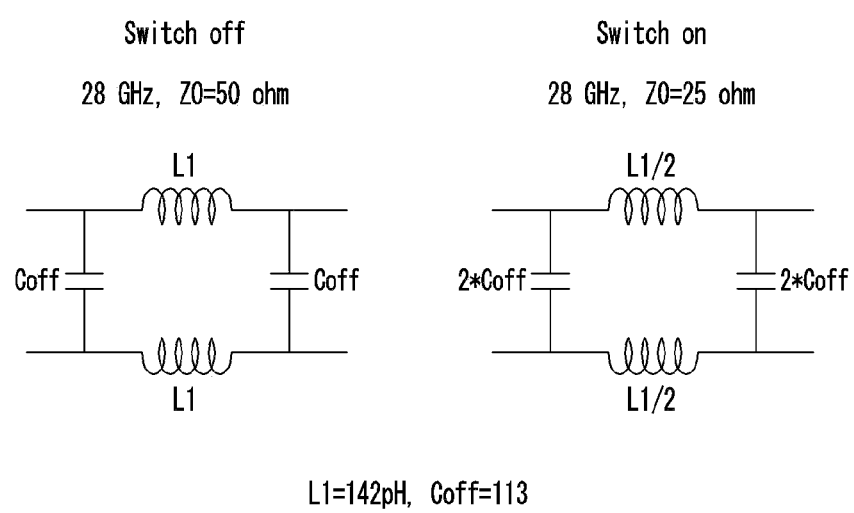
FIG. 14 is a diagram illustrating L and C values according to a characteristic impedance $Z_0$ of a differential lumped transmission line according to one embodiment of the present disclosure.

FIG. 14 is a diagram illustrating L and C values according to a characteristic impedance $Z_0$ of a differential lumped transmission line according to one embodiment of the present disclosure.

When a L2=L1=142 pH value is selected and $C_{off}$=113 fF is selected in the embodiments of FIGS. 8 to 12 and when two cross-coupled switches 130 are turned off as shown in FIG. 14, the reconfigurable circuit may operate as a differential transmission line having a characteristic impedance of $Z_0$=50 ohm at a 28 GHz frequency, and when the two cross-coupled switches 130 are turned on in series, the reconfigurable circuit may operate as a differential transmission line having a characteristic impedance of $Z_0$=25 ohm at a 28 GHz frequency.

Figure 15:
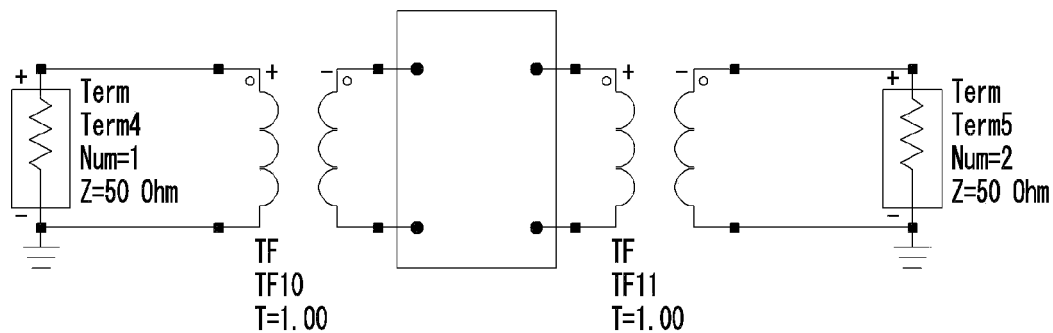
FIG. 15 is a conceptual diagram illustrating a simulation result of the reconfigurable circuit according to one embodiment of the present disclosure.
Figure 15:
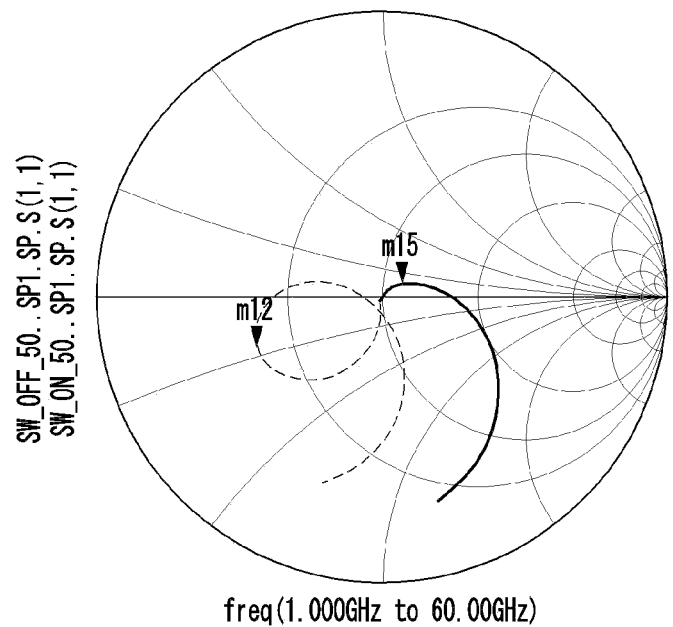

FIG. 15 is a conceptual diagram illustrating a simulation result of the reconfigurable circuit according to one embodiment of the present disclosure.

In relation to the embodiments of FIGS. 13 and 14, the simulation result under the condition of impedance=50 ohm observed at the ports at both ends are shown in FIG. 15.

Referring to FIG. 15, based on the simulation result, it can be seen that the transmission line operates as a transmission line having an impedance of $Z_0$=50 ohm when the switch is turned off and operates as a transmission line having an impedance of $Z_0$=25 ohm when the switch is turned on.

Figure 16:
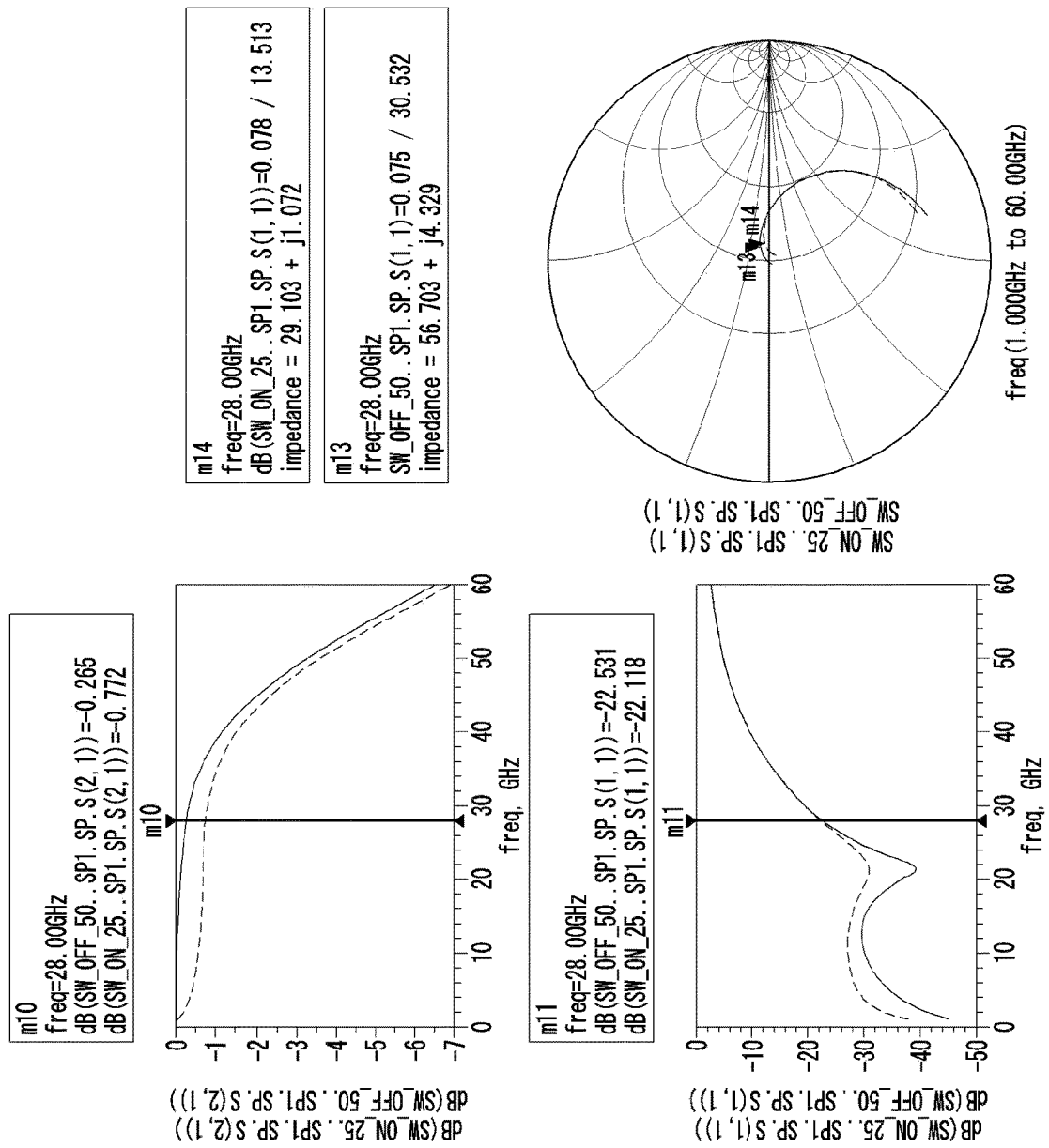
FIG. 16 is a conceptual diagram illustrating a simulation result of the reconfigurable circuit according to another embodiment of the present disclosure.

FIG. 16 is a conceptual diagram illustrating a simulation result of the reconfigurable circuit according to another embodiment of the present disclosure.

Referring to FIG. 16, simulation results are shown under the condition that port impedances of both ends are 50 ohm when the switch is turned off and the port impedances of both ends are 25 ohm when the switch is turned on.

Figure 17:
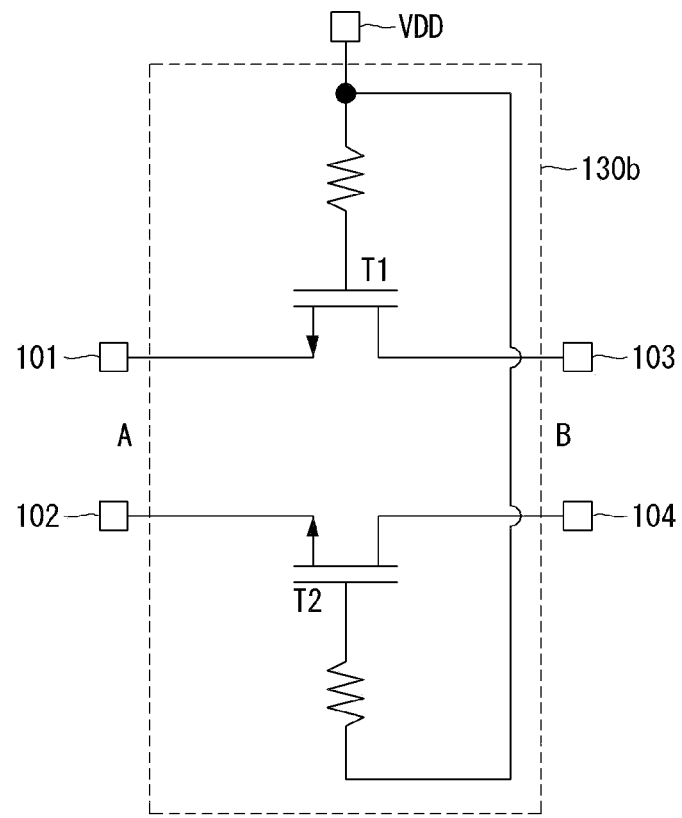
FIG. 17 is a schematic circuit diagram illustrating a switch usable for a differential transmission line of a comparative example.

FIG. 17 is a schematic circuit diagram illustrating a switch usable for a differential transmission line of a comparative example.

Referring to FIG. 17, a series differential switch 130b usable for the differential transmission line of the comparative example may include a first switch T1 disposed between and connected to a first terminal 101 and a third terminal 103 in series, and a second switch T2 disposed between and connected to a second terminal 102 and a fourth terminal 104 in series. In this case, a control terminal of the first switch T1 and a control terminal of the second switch T2 may be commonly connected to a power supply voltage VDD.

When a reconfigurable circuit is implemented using the series differential switch 130b of the comparative example of FIG. 17, there is no problem when the series switches T1 and T2 are turned on. However, when the series switches T1 and T2 are turned off, since ports A and B at both ends of the switch are not completely isolated from each other in the reconfigurable circuit due to parasitic capacitance components of the series switches T1 and T2, different circuits 110 and 120 at both sides of the reconfigurable circuit based on the series differential switch 130b adversely affect impedance matching characteristics and isolation performance due to leakage so that isolation may be degraded.

Meanwhile, in an embodiment in which the reconfigurable circuit is a transmission line, since a size of the transmission line is basically very large, in integrated circuit design, a relatively small-sized transmission line may be implemented using a C-L-C lumped element composed of an equivalent circuit of a capacitor and an inductor. In addition, when the transmission line is configured as a differential transmission line in the integrated circuit design, since performance independent of a ground condition may be obtained, the transmission line is suitable for a high-frequency circuit and, when multiple channels are configured, the transmission line is also advantageous for isolation between the multiple channels.

As described above, unlike the comparative example of FIG. 17, in the differential transmission line as the embodiment of the reconfigurable circuit of the embodiment of the present disclosure, the series differential switch having the cross-coupled capacitance is used as the switch or switch block of the differential transmission line so that high isolation between both ends of the switch may be provided in the differential transmission line.

Figure 18:
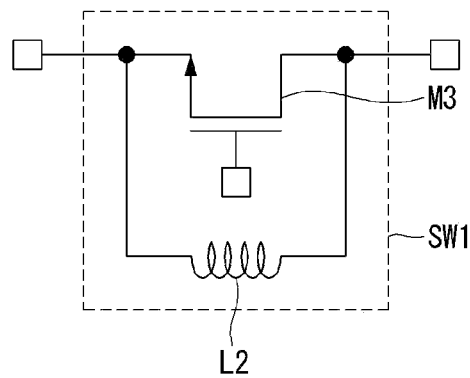
FIG. 18 is a schematic circuit diagram illustrating a switch structure of the comparative example usable for the differential transmission line.

FIG. 18 is a schematic circuit diagram illustrating a switch structure of the comparative example usable for the differential transmission line.

Referring to FIG. 18, in order to solve a problem of degradation due to characteristics of the differential transmission line according to the related art, a separate inductor L2 may be additionally connected to a switch M3 in parallel at a position corresponding to a first switch SW1 or a second switch SW2. When the inductor L2 is added to the switch M3 of FIG. 18 in parallel, a switch off capacitance may be offset. However, there is a problem of cost due to a large size of the inductor L2, and additional insertion loss occurs due to a finite Q-factor of the inductor L2, and since a frequency band in which the inductor L2 may offset a capacitance is not wide, there is a limit in that a usable bandwidth is also limited.

The comparative example of FIG. 17 shows a general series differential switch. In this case, when the switch is turned off, since a $C_{off}$ component is observed next to the switch, isolation cannot be provided. Although the $C_{off}$ component may be offset using the additional inductor as shown in FIG. 18, the size increases and since the structure uses L-C resonance, a frequency band in which the isolation is provided may be limited.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A reconfigurable circuit for a differential network, comprising:
   a first circuit which is a two-port differential circuit;
   a first cross-coupled switch circuit connected to a first port on one side of the first circuit in parallel; and
   a second circuit connected to a second port on the other side of the first cross-coupled switch circuit in series,
   wherein the first cross-coupled switch circuit includes:
   a first series switch disposed between and connected to a first terminal of the first port and a first terminal of the second port in series;
   a second series switch disposed between and connected to a second terminal of the first port and a second terminal of the second port in series;
   a first cross-coupled element disposed between and connected to the first terminal of the first port and the second terminal of the second port; and
   a second cross-coupled element disposed between and connected to the second terminal of the first port and the first terminal of the second port.

2. The reconfigurable circuit of claim 1, further comprising a second cross-coupled switch circuit connected to a third port on the other side of the first circuit in parallel,
   wherein the second circuit is disposed between and connected to the first cross-coupled switch circuit and the second cross-coupled switch circuit in series.

3. The reconfigurable circuit of claim 1, wherein, based on an operating mode of the first cross-coupled switch circuit, a parallel combined impedance of an externally expressed circuit by the second circuit or a parallel impedance excluding an influence of the second circuit is provided as an input impedance of the first port which is equivalently connected to the first circuit in parallel.

4. The reconfigurable circuit of claim 1, wherein, in a series connection mode of the first cross-coupled switch circuit, a parallel combined impedance of the externally expressed circuit and an equivalent capacitance by the second circuit is provided as an input impedance of the first port which is equivalently connected to the first circuit in parallel.

5. The reconfigurable circuit of claim 4, wherein, in a first series connection mode of the series connection mode of the first cross-coupled switch circuit, the second circuit is provided as the externally expressed circuit, and the parallel combined impedance of the second circuit and the equivalent capacitance is provided as the input impedance of the first port.

6. The reconfigurable circuit of claim 5, wherein, in the first series connection mode of the series connection mode of the first cross-coupled switch circuit, the first cross-coupled element is a first cross-coupled capacitor, and the second cross-coupled element is a second cross-coupled capacitor.

7. The reconfigurable circuit of claim 6, wherein, in the first series connection mode of the series connection mode of the first cross-coupled switch circuit, the first series switch and the second series switch are turned on.

8. The reconfigurable circuit of claim 5, wherein, in the first series connection mode of the series connection mode of the first cross-coupled switch circuit, the first cross-coupled element is a first cross-coupled switch, and the second cross-coupled element is a second cross-coupled switch.

9. The reconfigurable circuit of claim 8, wherein, in the first series connection mode of the series connection mode of the first cross-coupled switch circuit, the first series switch and the second series switch are turned on, and the first cross-coupled switch and the second cross-coupled switch are turned off.

10. The reconfigurable circuit of claim 4, wherein, in a second series connection mode of the series connection mode of the first cross-coupled switch circuit, an inverted circuit of the second circuit is provided as the externally expressed circuit, and a parallel combined impedance of the inverted circuit of the second circuit and an equivalent capacitance is provided as an input impedance of the first port.

11. The reconfigurable circuit of claim 10, wherein, in the second series connection mode of the series connection mode of the first cross-coupled switch circuit, the first cross-coupled element is a first cross-coupled switch, and the second cross-coupled element is a second cross-coupled switch.

12. The reconfigurable circuit of claim 11, wherein, in the second series connection mode of the series connection mode of the first cross-coupled switch circuit, the first series switch and the second series switch are turned off, and the first cross-coupled switch and the second cross-coupled switch are turned on.

13. The reconfigurable circuit of claim 1, wherein, in an open mode of the first cross-coupled switch circuit, a parallel impedance of an equivalent capacitance excluding an influence of the second circuit is provided as an input impedance of the first port which is equivalently connected to the first circuit in parallel.

14. The reconfigurable circuit of claim 13, wherein, in the open mode of the series connection mode of the first cross-coupled switch circuit, the first cross-coupled element is a first cross-coupled capacitor, the second cross-coupled element is a second cross-coupled capacitor, and the first series switch and the second series switch are turned off.

15. The reconfigurable circuit of claim 13, wherein, in the open mode of the series connection mode of the first cross-coupled switch circuit, the first cross-coupled element is a first cross-coupled switch, the second cross-coupled element is a second cross-coupled switch, the first series switch and the second series switch are turned off, and the first cross-coupled switch and the second cross-coupled switch are turned on.

16. The reconfigurable circuit of claim 1, wherein, in a short mode of the first cross-coupled switch circuit, a short circuit is provided as an input impedance of the first port which is equivalently connected to the first circuit in parallel.

17. The reconfigurable circuit of claim 16, wherein, in the short mode of the series connection mode of the first cross-coupled switch circuit, the first cross-coupled element is a first cross-coupled switch, the second cross-coupled element is a second cross-coupled switch, the first series switch and the second series switch are turned on, and the first cross-coupled switch and the second cross-coupled switch are turned on.

18. The reconfigurable circuit of claim 2, wherein, based on operating modes of the first cross-coupled switch circuit and the second cross-coupled switch circuit, a parallel combined impedance of an externally expressed circuit by the second circuit or a parallel impedance excluding an influence of the second circuit is provided as a first input impedance of the first port and a second input impedance of the second port which are equivalently connected to the first circuit in parallel.

19. The reconfigurable circuit of claim 1, wherein an equivalent capacitance of each of the first series switch and the second series switch is implemented to be equal to an equivalent capacitance of each of the first cross-coupled element and the second cross-coupled element.

20. The reconfigurable circuit of claim 19, wherein a combined capacitance twice the equivalent capacitance of each of the first cross-coupled element and the second cross-coupled element or a parallel combined impedance of the externally expressed circuit by the second circuit and the combined capacitance is provided as the input impedance of the first port which is equivalently connected to the first circuit in parallel.

* * * * *